United States Patent [19]

Zimmer

[11] Patent Number: 4,718,880
[45] Date of Patent: Jan. 12, 1988

[54] POWER TRANSMISSION CHAIN-BELT

[75] Inventor: George A. Zimmer, Ithaca, N.Y.

[73] Assignee: Borg-Warner Corporation, Chicago, Ill.

[21] Appl. No.: 384,449

[22] Filed: Jun. 3, 1982

[51] Int. Cl.⁴ .................................. F16G 1/22
[52] U.S. Cl. ...................... 474/201; 474/242
[58] Field of Search ............ 474/201, 242, 245, 238, 474/244, 272

[56] References Cited

U.S. PATENT DOCUMENTS

| | | | |
|---|---|---|---|
| 3,916,709 | 11/1975 | Steuer et al. | 474/201 |
| 4,078,442 | 3/1978 | Bendall | 474/245 |
| 4,313,730 | 2/1982 | Cole, Jr. et al. | 474/201 |
| 4,342,560 | 8/1982 | Ledvina et al. | 474/157 |
| 4,344,761 | 8/1982 | Steuer | 474/245 |
| 4,386,922 | 6/1983 | Ivey | 474/201 |
| 4,392,843 | 7/1983 | Smit | 474/201 |

FOREIGN PATENT DOCUMENTS 56-52647  5/1981  Japan .................. 474/242

Primary Examiner—Lawrence Staab
Assistant Examiner—Dwight G. Diehl
Attorney, Agent, or Firm—Aubrey L. Burgess

[57] ABSTRACT

A power transmission chain-belt, especially adapted to provide a drive and transmit power between the pulleys of a variable ratio pulley transmission. The chain-belt is constructed of a plurality of ranks or sets of interleaved links, each rank being joined to the next adjacent rank by pivot means, such as round pins, or a pin and rocker, to permit articulation of the belt. Some of the ranks or sets of links have a pitch which is different from the pitch of the other ranks or sets of links. Generally trapezoidal load blocks are located between the pivot means of each rank or set of links, which blocks have opposite edge surfaces to contact the flanges of the pulleys. The front and rear surfaces of the blocks can be tapered to permit the articulation of the belt.

3 Claims, 10 Drawing Figures

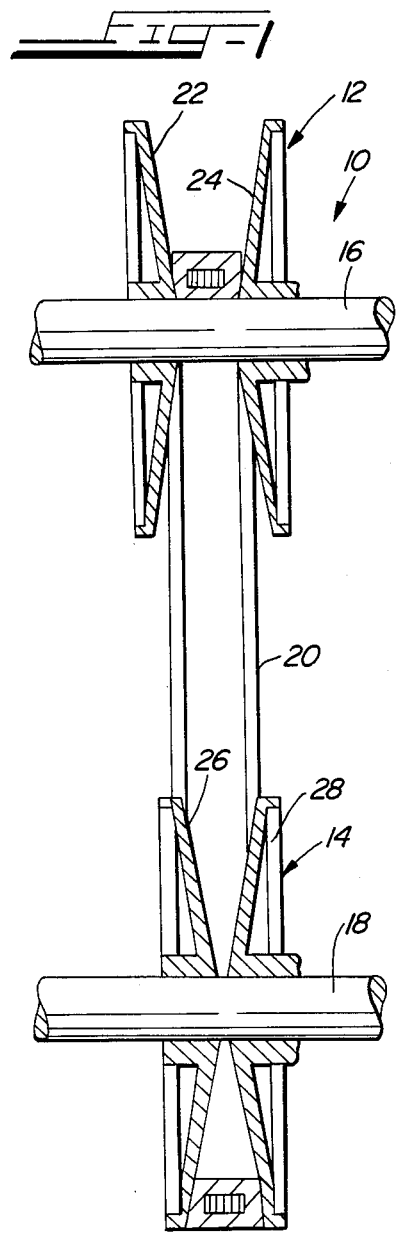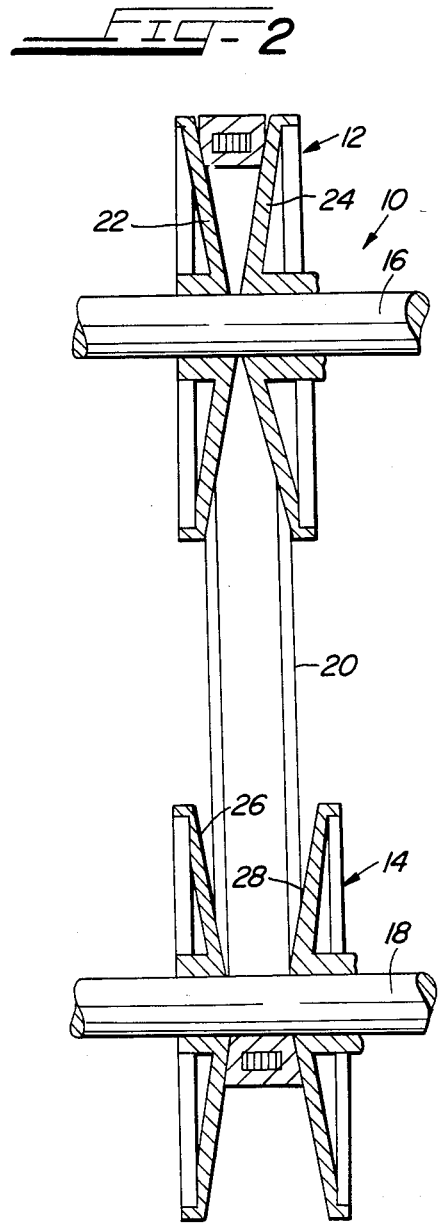

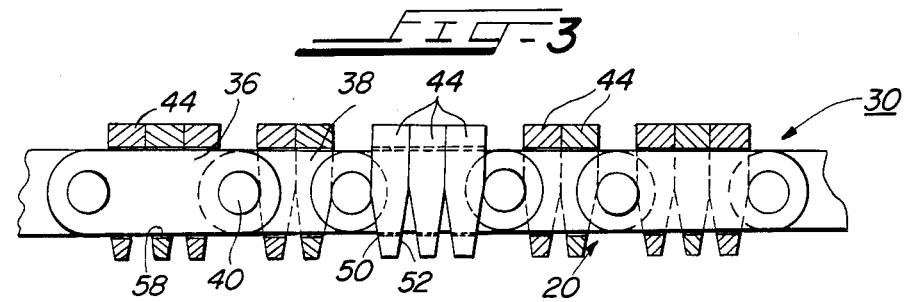
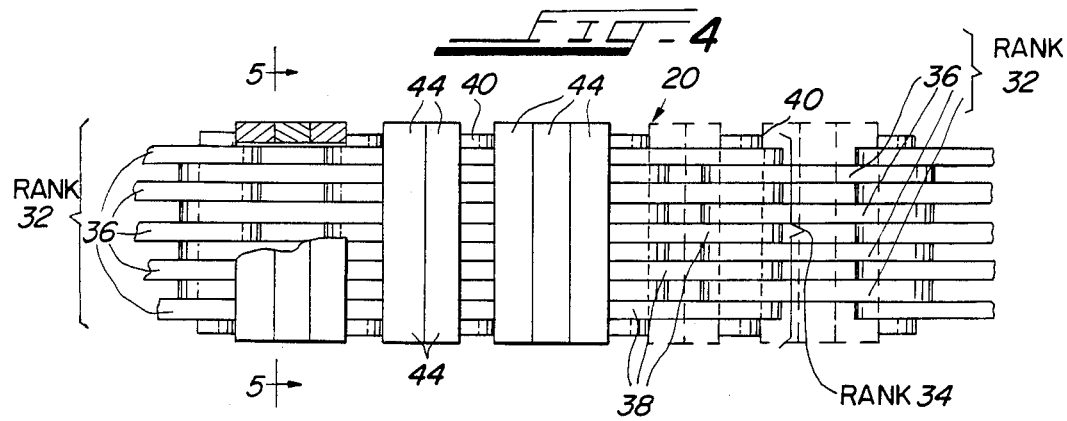
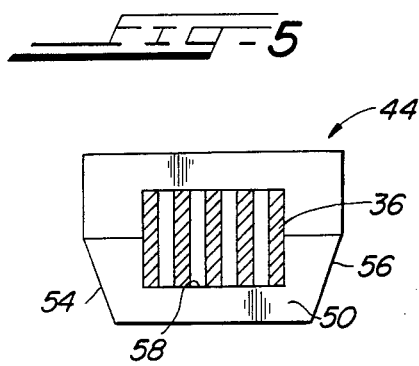
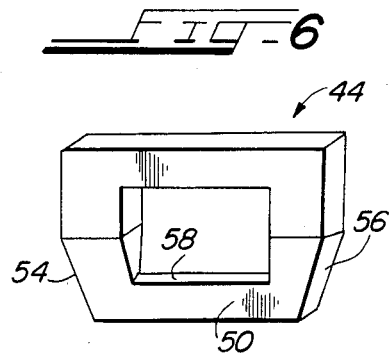

POWER TRANSMISSION CHAIN-BELT

BACKGROUND OF THE INVENTION

Power transmission belts for use in variable pulley transmissions comprising the general combination of interconnected links with means to engage the pulley flanges have been suggested in the art. Some of the engaging means are the ends of the interconnecting pivot means or angled sheet metal plate-like means and the like.

The use of ranks or sets of interleaved links connected to pivot means and drive blocks of generally trapezoidal shape located between adjacent drive pins to transmit load to the pins is disclosed and claimed in U.S. Pat. No. 4,313,730, issued Feb. 2, 1982 to Cole et al, entitled "Metal Chain Belt", which is assigned to the assignee of the present invention.

Other types of metal drive belts are taught, for example, by van Doorne et al in U.S. Pat. No. 3,720,113, granted Mar. 13, 1973. The belt of this patent comprises a flexible band of superimposed steel strips with metal blocks thereon having tapered edges to engage the flanges of the pulleys of a variable pulley transmission. The metal blocks in this belt move longitudinally and the load is carried by the blocks.

The projected cost of belts constructed according to van Doorne et al is several times the cost of a chain-belt as taught by Cole et al. Thus, economically, the Cole et al chain-belt is much more attractive than the van Doorne belt.

In testing a chain-belt comprising the interconnected ranks or sets of interleaved links and drive block in a pulley transmission, it has become apparent that the noise generated by the drive belt and pulley peaks at certain frequencies which are related to block-pulley flange engagement rate.

Acoustic research results have proved that a white, irregular or arhythmic noise is less noticeable and annoying than a noise which contains recognizable pure tones or a single frequency. The most annoying chain noise is the single tone or frequency which may occur above 1000 Hz. but stands above the spectrum by 5 to 10 db.

SUMMARY OF THE INVENTION

A chain-belt especially adapted to provide a drive between the pulleys of variable pulley transmission, is constructed of a plurality of ranks or sets of interleaved links, the adjacent ranks or sets being joined by pivot means. A rank or set of links is a transverse group of links between and encompassing two adjacent pivot means. The pivot means can comprise round pin, or sets of pins and rocker, both of which pivot means are well known in the art. Generally trapezoidal drive blocks are located on the ranks of links between the pivot means to transmit the load to the pivot means. The drive blocks can have tapered front and back surfaces to permit the assembly to wrap around the pulleys.

The noise pattern generated by a drive chain-belt, constructed as just described, can according to this invention, be modified and made acceptable for the automotive industry by constructing the chain-belt with some ranks or sets of links with a pitch which is different from the pitch of other ranks or sets of links. The pitch is the distance between the pivot centers. In other words, the chain-belt is constructed with some sets of links with link lengths different from the lengths of other sets of links. To accommodate the different pitches (or link lengths) different numbers or different thicknesses of drive blocks are used, and the blocks extend from pivot means to pivot means. Chain-belts manufactured according to this invention may be constructed with alternate ranks or sets of links of different pitches, or may be constructed of randomly assembled ranks or sets of links of different pitches. In either event, the generated operational noise pattern of such chain-belts is modified in such a manner as to make the chain-belt acceptable (from acoustic standpoint) for use in the automotive industry without affecting the tensional strength and other operational characteristics of the chain-belt.

THE DRAWINGS

FIG. 1 is a schematic illustration of a variable pulley drive system in one drive ratio;

FIG. 2 is a schematic illustration of the variable pulley drive system of FIG. 1 in another drive ratio;

FIG. 3 is a side view of a portion of a chain-belt according to one embodiment of this invention with parts broken away;

FIG. 4 is a plan view of the chain-belt of FIG. 3 with parts broken away;

FIG. 5 is a sectional view, taken on line 5—5 of FIG. 4 particularly illustrating a load block;

FIG. 6 is a perspective view of a drive or load block usable in the chain-belt of this invention;

DETAILED DESCRIPTION OF THE INVENTION

Figure 7:
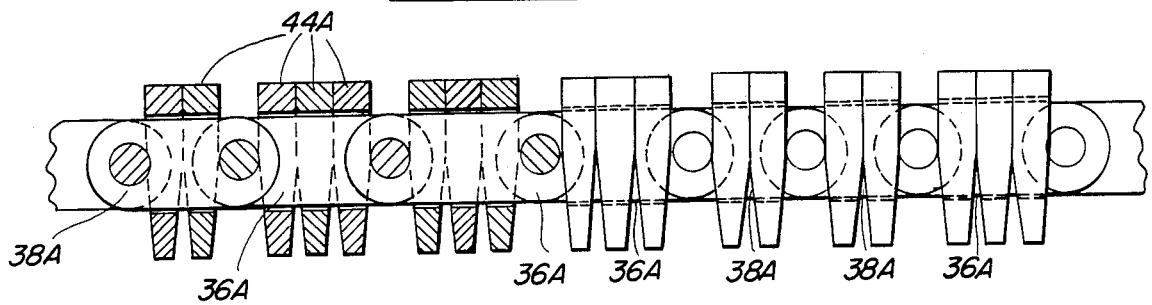
FIG. 7 is a side view similar to that of FIG. 3, and illustrates another embodiment of a chain-belt according to this invention.

FIGS. 1 and 2 illustrate schematically a variable pulley transmission 10 comprising a pair of spaced pulleys 12 and 14 mounted on generally parallel shafts 16 and 18. The pulleys are interconnected by a continuous transmission belt 20 or the like. The pulley 12 comprises pulley flanges 22 and 24 and the pulley 14 comprises pulley flanges 26 and 28. At least one of the flanges of each pulley is axially movable with respect to the other to vary the drive ratio between the pulleys 12 and 14. FIGS. 1 and 2 illustrate the extremes of ratios between the pulleys. The flanges of the pulleys have conical surfaces which are engaged by the edges of the transmission belt. One or the other of the shafts can be designated as the drive shaft and connected to a source of power (not shown); the other shaft is designated as the driven shaft and is connected to the load which is to be driven, as for example, the wheels of an automobile (not shown).

The drive-chain or chain-belt of this invention, which for the first embodiment to be described is identified by the reference character 30, is connected in an endless loop suitable to drivingly interconnect the pulleys 12 and 14 of a variable pulley transmission as schematically illustrated in FIGS. 1 and 2, it being understood that it can also be used to drivingly interconnect fixed diameter pulleys, is so desired.

Looking now at FIGS. 3 and 4, there is illustrated a portion of the drive chain-belt 30 comprising a plurality of ranks or sets 32 and 34 of interleaved links 36 and 38. Pivot means, shown as round pins 40, connect ranks 32 and 34 of links 36 and 38 to permit articulation of the chain-belt 30. In the illustrated embodiment, ranks 32 and 34 alternate with one another.

In that the pitch is the distance between pivot pin centers, and links 36 are longer than the links 38, it can thus be seen that the pitch of ranks 32 is greater than the pitch of ranks 34.

In order to engage the flanges 22, 24, and 26, 28 of pulleys 12 and 14, respectively (see FIGS. 1 and 2), load blocks 44 (FIGS. 5 and 6) are positioned around the links and between the pins 40. The number of load blocks of a given thickness between any two successive pivot pins 40 depends upon the pitch of the links and in this embodiment, all load blocks are illustrated as having the same thickness. Also, each load block 44 has a generally rectangular central opening 58 permitting it to be assembled over links. The surfaces 54, 56 are those which engage the pulley flanges, and the angle at side wall surface 54, 56 gives each block a trapezoidal appearance when viewed from the front or rear. At times, load blocks such as those described are referred to as being generally "V-shaped". The tapered front and back surfaces 50, 52 permit the chain-belt to wrap the pulleys. In some cases, the blocks need not be tapered as at 50 and 52, because the space between blocks provided by the pivot pins is sufficient to permit the wrapping of the chain-belt on the pulleys. Generally the load blocks, the links, and the pivot means are made of metal, for example various types of steel. The pivot means are usually of a higher carbon steel than the load blocks which are of a higher carbon steel than the chain links. The pivot means may be heat treated to increase their strength. The chain links and the load blocks can be stamped from sheet metal using known stamping techniques. The pivot means can be cut from a drawn metal shape. Each load block can be a laminate of metal plates if desired. The edge surfaces of the load blocks which engage the pulley flanges can be coated or otherwise provided with means to enhance the frictional engagement with the flanges.

The chain-belt embodiment of FIG. 7 is similar to that of FIG. 3 but differs in the random arrangement of ranks 32A and 34A of links 36A and 38A. The load blocks 44A are essentially the same as described in connection with FIGS. 5 and 6.

Figure 8:
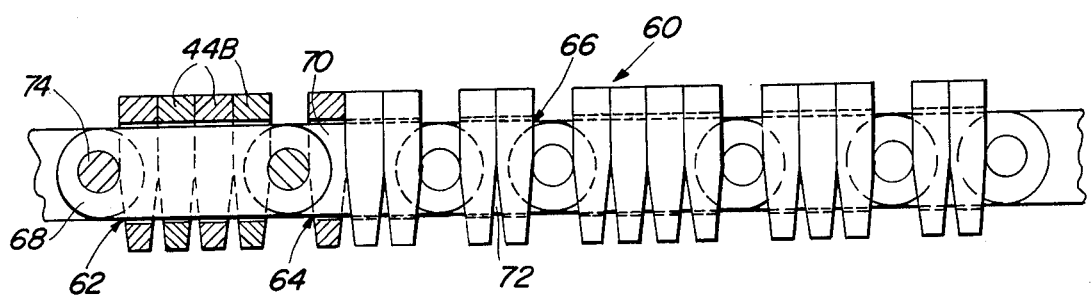
FIG. 8 is another side view similar to that of FIGS. 3 and 7, and illustrates still another embodiment of the chain-belt of this invention.
Figure 9:
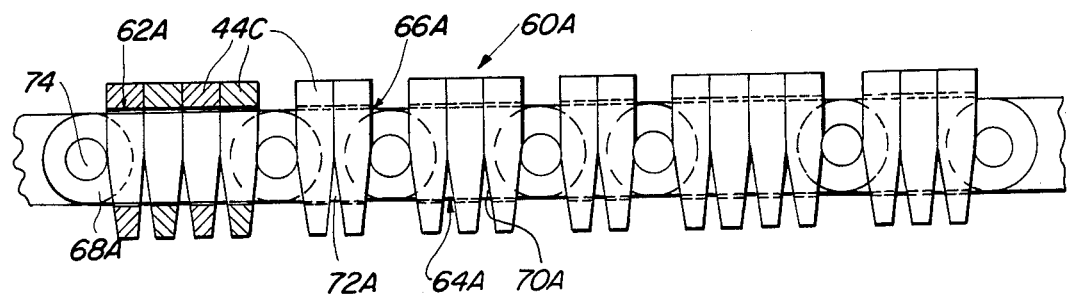
FIG. 9 is a side view similar to that of FIGS. 3, 7 and 8, and illustrates a modification of the embodiment of FIG. 8.

FIGS. 8 and 9 illustrate other embodiments of the invention. FIG. 8 shows a chain-belt 60 constructed of ranks or sets 62, 64 and 66 of interleaved links 68, 70 and 72, respectively, joined by pivot means, such as a round pin 74. The pitches of the ranks 62, 64 and 66 are different; the chain-belt is constructed of such ranks in a regular sequence. Load blocks 44B are positioned between the pins 74 and are similar to the before described load blocks 44 and 44A. Each block has tapered edges to engage the pulley flanges, and a central opening to fit over the links of a rank and between the pivot means, similar to blocks 44.

In FIG. 9, the ranks 62A, 64A and 66A of links 68A, 70A, and 72A are randomly arranged; similar load blocks 44C are positioned as in the previous embodiments.

Figure 10:
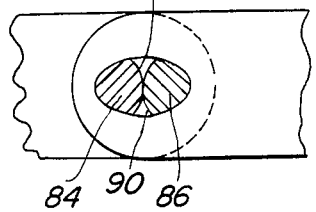
FIG. 10 is a partial side view, illustrating a second embodiment of a pivot means for the chain-belt of the invention.

In FIG. 10 an alternative pivot means is illustrated which comprises a pin and rocker arrangement of members 84 and 86 in lieu of the round pins 40, or 74, in the previously described embodiments. The members 84 and 86 have opposing surfaces 88 and 90 which rock or roll on one another. In some instances, one member is designated a pin and the other a rocker, and one may be longer than the other. The pin and rocker may be identical in cross-section or of different cross-sections, so long as the opposing rocking surfaces are present.

The use of a chain-belt constructed according to the invention has been found to modify the noise pattern generated in previous variable pulley transmissions by the regular impact of the load blocks against the flanges of the pulleys. The predominant frequency (f) of the noise generated by the impact of the load blocks against the pulley flanges is $$f = J/P$$

where J is the chain-belt velocity in feet/second, and P is chain pitch in feet.

By constructing the chain-belt according to this invention, P is no longer fixed. Thus there is no single frequency which predominates in the noise spectrum; rather the noise spectrum includes more than one frequency, and the effect on the human ear is much less objectionable than when it is fixed.

It is known in the art that the pitch line (a line drawn through the centers of the successive pivot means) of a rigid link chain on a drive sprocket is polygonal rather than circular and its engagement action is inherently one of impact with the teeth of the drive sprockets. The path of the chain in relation to the sprocket gives rise to what is termed "chordal action", i.e. the pitch line traverses a radial path as well as a longitudinal path as it enters the sprockets. This "chordal action" is also present when a chain-belt is used in a pulley transmission, and the impact gives rise to the undesirable noise peaks caused by the impact engagement action. The modifications taught by this invention in the number and spacing of the drive blocks carried by the chain because of the different pitches of the chain changes the pattern of the impact of the blocks with the pulley flanges and assists in modifying the ultimate noise pattern to be less offensive to the human ear.

I claim:

1. A metal chain-belt especially adapted to provide a drive between the pulleys of a variable ratio transmission, said pulleys being each constructed of a pair of pulley flanges, comprising:
   a plurality of sets of interleaved links, some of said sets of links having a pitch which is different from and larger than the pitch of other sets of links;
   pivot means joining the adjacent sets of links to permit articulation of said sets of links; and
   a plurality of generally trapezoidal load blocks encircling said links and located between said pivot means for each set of links, said blocks having opposite edge surfaces adapted to contact the pulley flanges to transmit power between the pulleys, the number of the blocks encircling said some sets of links being greater than the number of blocks encircling said other sets of links and thus presenting a larger edge surface area for contacting said pulley flanges.

2. A chain-belt as recited in claim 1, constructed of random arrangement of the different pitch sets of links.

3. A chain-belt as recited in claim 1, constructed of a fixed pattern of sets of links having different pitches.

* * * * *